United States Patent [19]

Mueller et al.

[11] 4,144,578

[45] Mar. 13, 1979

[54] METHOD AND APPARATUS FOR MONITORING AND/OR CORRECTING OF A PHYSICAL CHARACTERISTIC

[75] Inventors: Martin Mueller, Bickenbach; Harald Schoenfeld, Darmstadt-Arheilgen, both of Fed. Rep. of Germany

[73] Assignee: Carl Schenck AG, Darmstadt, Fed. Rep. of Germany

[21] Appl. No.: 764,087

[22] Filed: Jan. 31, 1977

[30] Foreign Application Priority Data

Feb. 12, 1976 [DE] Fed. Rep. of Germany ....... 2605485

[51] Int. Cl.² .................... G06F 15/36; G06G 7/18
[52] U.S. Cl. .................... 364/575; 364/551; 364/571; 364/734; 364/812
[58] Field of Search ............ 364/550, 551, 552, 554, 364/571, 575, 734, 811, 812, 724, 602

[56] References Cited

U.S. PATENT DOCUMENTS

| | | | |
|---|---|---|---|
| 2,977,462 | 3/1961 | Utt et al. | 364/811 |
| 3,478,328 | 11/1969 | Schillinger | 364/575 |
| 3,493,773 | 2/1970 | Power | 364/575 |
| 3,705,297 | 12/1972 | John | 364/724 |
| 3,809,874 | 5/1974 | Pozzetti et al. | 364/575 |
| 3,983,376 | 9/1976 | Pozzetti | 364/552 |

*Primary Examiner*—Felix D. Gruber
*Attorney, Agent, or Firm*—W. G. Fasse; W. W. Roberts

[57] ABSTRACT

A method and apparatus for deriving mean value signals is disclosed, wherein input signals are compared with signals stored in a first storage device to produce difference signals. These difference signals are added to the signals stored in the first storage device, to produce corrected mean value signals, which are in turn stored in a second storage device. The output of the second storage device is transferred to the first storage device, to update the mean value stored in the first storage device.

16 Claims, 6 Drawing Figures

METHOD AND APPARATUS FOR MONITORING AND/OR CORRECTING OF A PHYSICAL CHARACTERISTIC

BACKGROUND OF THE INVENTION

The invention relates to a method and apparatus for monitoring and/or correcting of a physical characteristic or quantity ascertained from work pieces, for example, rotors for electrical motors, crankshafts, and the like produced in substantial numbers. The physical quantity may be modified during a or by a machining operation by determining the mean value of the characteristics of several finished work pieces. The invention is particularly directed to a method and apparatus for the monitoring of the state of unbalance of such work pieces.

In the operation of balancing machines, errors can be caused by many factors. Errors occur, for instance, in picking up the work pieces and placing them in processing machines, in the measurement of unbalance signals and in their transmission. Errors may also occur in the conversion of the unbalance signals and in particular, in compensating for an unbalance by removing or adding material. The individual errors may result in a residual unbalance of the work pieces leaving the balancing machine. Although this residual unbalance is in part a function of the initial unbalance of the original work piece, it is not proportional to the initial unbalance.

In the balancing with mass-centering machines of a large number of unfinished work pieces of the same kind, e.g., crankshaft blanks, methods are known for determining the unbalance before and after processing, as a typical physical characteristic of the work pieces in a fairly large number of individual work pieces. Customarily, these methods employ the component measuring method. All the unbalance values of these work pieces are combined in a mean value, or in the case of the component method, in mean values of two components. A comparison of these mean values of the unbalance obtained before and after the processing permits the determination of the unbalance changes caused by the processing. It is assumed here that, in the machining of work pieces which were approximately equal in the original state, the same amounts of material are removed at the same points.

In a known balancing method (German Pat. No. 975,210 and corresponding U.S. Pat. No. 2,804,775), centering marks are made on the work piece in a balance-centering machine in such a manner that not only the unbalance of the unfinished work piece, but also the expected average change in the unbalance due to the subsequent machining is taken into consideration.

However, forming the mean value and correcting the adjustment of balance-centering machines, made in dependence thereon, require a considerable effort. In particular, either no consideration is given, or consideration can be given only with extensive computing effort, to the fact that initially, only a relatively small number of finished work pieces is available for forming the mean value. This is primarily due to the fact that one attempts to obtain a mean value available for the correction as soon as possible, i.e., after having evaluated only a small number of produced work pieces. Because of the relatively small number of individual work pieces, the reliability of the mean value so formed is relatively low. It is not very satisfactory to continue working with such a mean value of low reliability when a larger number of finished work pieces is available.

OBJECTS OF THE INVENTION

In view of the above, it is the aim of the invention to achieve the following objects, singly or in combination:

to provide a method as mentioned at the outset, in such a manner that the physical characteristic is continuously monitored and, if indicated, an optimal correction of the physical characteristic of the work pieces, e.g., the unbalance of work pieces, becomes possible;

to provide a compensation or correction value, for instance in balancing crankshafts, which compensation or correction takes into account unequivocally and at all times the measured results, for the adjustment of balance-centering machines; and to form and, if desired, indicate the mean value which is used in the correction, in a continuously progressing manner without any need for a resetting.

SUMMARY OF THE INVENTION

According to the invention, this problem is solved by providing a method and apparatus wherein the mean value used is a continuously advancing quasi-continuous mean value which does not require resetting, and continuously correcting such mean value as a function of the deviation of the measured characteristic of each individual, finished work piece from this mean value. Thus, a continuous procedure of deriving and, if desired, indicating the mean value is obtained without the need for resetting.

In a further embodiment of the invention, the continuously advancing mean value is employed for correcting pre-adjusted machine settings in the machining of the work pieces, whereby the equalization or compensation of the physical characteristic to be monitored, e.g., the unbalance or a dimension of the work piece, may be optimized.

The correction of the machining adjustments is advantageously accomplished according to the mean value in intervals depending on the settling constant of the mean value and the number of work pieces between a current machining step and an immediately preceding one.

In monitoring and/or correcting the state of unbalance of work pieces, the floating mean value is advantageously derived separately for different balancing planes, from the components or the amounts of the vectors effective in the different planes. Further, a floating measure of the mean deviation of the individual values is also derived, in addition to the floating mean value. Thereby, the statistical distribution of unbalance data and the quality of the work of balancing machines can be monitored in an excellent manner.

A new floating mean value can be derived from a preceding mean value by adjusting the preceding value by a predetermined fraction of the deviation of the respective new value of the individual characteristic from the preceding mean value. This method can be realized with very simple circuitry. The new value for the mean deviation can be formed from the old value of the mean deviation by adjusting the old value by a predetermined fraction of the square or the absolute value of the difference between the new measurement value and the mean value.

If the method of the invention is used for controlling centering machines, the mean values of the unbalance components at the input of the balancing machine may be employed for the manual or automatic adjustment of the centering machine.

If the method of the invention is used for checking the work quality of automatic balancing machines, the mean value of the residual unbalances is indicated and/or an alarm given if a predetermined limit is exceeded.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS

Figure 1:
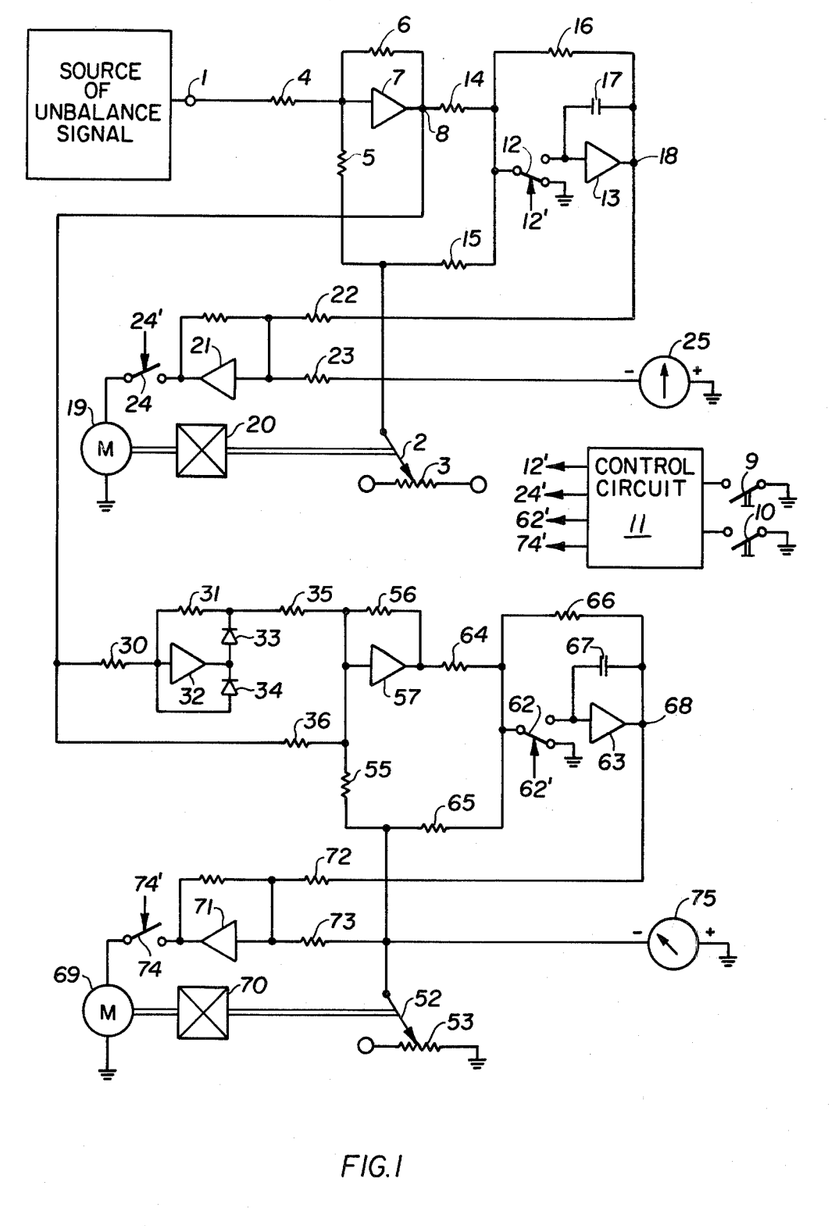
FIG. 1 is a circuit diagram showing one embodiment of the invention.

The upper portion of FIG. 1 shows the circuit for deriving mean values in accordance with the invention. The unbalanced signals to be used in the method of the invention may be generated in a manner as described in the U.S. Pat. No. 3,331,252 issued to G. H. Thomas et al. The unbalance components are taken from the outputs of the low pass filters 110 and 112, respectively. These signals are used as the current measured value. The current measured value is applied as a d.c. signal input voltage to the terminal 1. A voltage corresponding to the last applicable mean value is present, with reversed polarity, at the slider 2 of a potentiometer 3. The difference between the mean value and the current measurement value is formed by means of an operational amplifier 7 via the preferably equal resistors 4, 5 and 6. If a new current measurement value is present, this is reported to the control circuit 11 by actuation of the switch 9. Switch 9 may be controlled either manually or automatically. Unless the entire process is suppressed through the operation of a further switch 10, (for instance, if measurement values are invalid when the machine is idling), the control circuit 11 then transmits a command 12′ which actuates the switch 12. At the input of the amplifier 13, which has a feedback circuit via the resistor 16, a fraction of the difference between the mean value and the new measured value is added via the resistor 14 to the old mean value fed-in via the resistor 15. The resistors 15 and 16 are preferably equal, while the resistor 14 is larger in accordance with the desired fraction. At the output 18 of the amplifier 13, the voltage corresponding to the new mean value is thus formed.

The feedback capacitor 17 is charged to this voltage. Now the control circuit 11 returns the switch 12 to the position shown, so that the new mean value is temporarily stored in the capacitor 17. The capacitor 17 cannot discharge due to the high input resistance of the amplifier 13. The stored new mean value is now further transferred to a permanent-storage device, which is formed by the servo-potentiometer 3. To this end, the control circuit 11 subsequently furnishes a signal 24′ which closes the switch 24. At the input of the amplifier 21, the difference between the mean value 18 to be stored and the stored value (slider 2) is formed via the preferably equal resistors 22 and 23. To this end, the potentiometer 3 is connected to two voltage sources "+" and "−", which correspond to the limits, between which the instant measurement value and therefore, the mean value may vary.

The output of the amplifier 21 is applied by way of the switch 24 to the motor 19, which in turn moves the slider 2 of the potentiometer 3 via the gear box 20 until the difference between the voltages is zero. Thereby the new mean value (of reverse polarity) is assumed by the servo-system. The control circuit 11 now opens the switch 24.

Since the motor 19 is no longer energized, the stored mean value is available at the slider 2 of the potentiometer 3 as long as desired, and does not change even if the supply voltage is switched off. The mean value can be indicated via a suitable instrument such as meter 25 or processed further in any desired manner, for example, in a recorder or printer.

The circuit in the lower part of FIG. 1 is used to form a measure of the mean deviation as the mean value of the absolute deviation of the current measurement values, from the mean value. This circuit is largely the same as the circuit in the upper part of FIG. 1; corresponding components have designation numbers increased by 50.

The deviation of the instant measurement value from the mean value is taken from the output 8 of the amplifier 7. This deviation is fed, on the one hand, to the input of the operational amplifier 57 via the resistor 36 and on the other hand, to the input of the operational amplifier 32 via the resistor 30. The amplifier 32 is provided with negative feedback via the diode 33 and the resistor 31 for the positive polarity of its output voltage and via the diode 34 for the negative polarity of the output voltage. From the junction of the diode 33 and the resistor 31, a further resistor 35 leads to the input of the amplifier 57. The resistors 30 and 31 are preferably equal, while the resistor 35 has half the resistance of the resistor 36. It is achieved thereby in a manner known per se that the total current fed to the amplifier 57 via 35 and 36 corresponds to the absolute value of the output voltage of the amplifier 7. This value is equal to the absolute value of the deviation of the instant measured value from the mean value. At the slider 52 of the potentiometer 53, the last applicable mean deviation measure is present with the reversed polarity. The difference between this mean deviation and the absolute value of the instant deviation (of the current measurement value) from the mean value is derived in the operational amplifier 57, via the preferably equal resistors 55, 36 and 56. At the input of the amplifier 63, the new measure of the mean deviation is formed by adding to the old mean deviation fed-in via the resistor 65 and the slider 52, a fraction of the output voltage of the amplifier 57 via the resistor 64 as a correction. In a manner analogous to the upper part of FIG. 1, the new mean deviation measure is taken over by means of a limited-time command 62′, which actuates the switch 62, and the negative feedback resistor 66 (preferably equal to the resistor 65) into the store formed by the amplifier 63 and capacitor 67. Thereupon, the temporarily stored new mean deviation present at the output 68 of the amplifier 63 is transferred by means of a fourth control command 74' which operates the switch 74, into the servo-system which comprises the motor 69, the gear box 70 and the potentiometer 53 and acts as permanent storage. The process is the same as described for the upper part of FIG. 1. The potentiometer 53 is connected here between a negative voltage source and zero, since the mean deviation measurement can assume only one sign. The mean deviation measure can be taken off with reversed polarity at the slider 52 of the potentiometer and indicated via an instrument such as meter 75, or otherwise processed further in a suitable manner.

Figure 3:
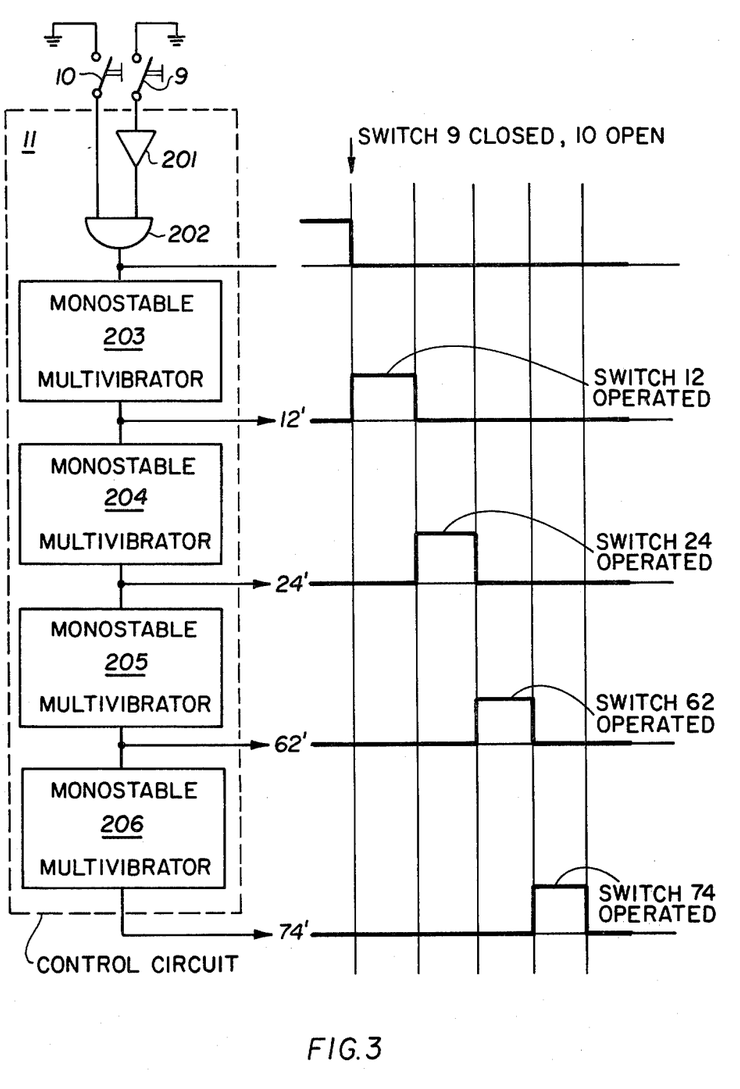
FIG. 3 shows details of a control circuit which may be used in FIG. 1.

The control circuit 11 may comrise, for instance, as shown in FIG. 3, four cascade connected monostable stages 203, 204, 205, and 206 which are excited sequentially, operation of the first stage being triggered via NAND-gate 202 and inverter 201 by closing of the switch 9 unless switch 10 is closed simultaneously. The four stages therefore transmit, one after the other in time, the four non-overlapping control signals 12', 24', 62', and 74' respectively. These control signals operate the corresponding switches 12, 24, 62, 74. The latter may be designed as relay contacts or electronic switches.

In FIG. 1, in lieu of the components 30 to 36, a multiplier may be used, with the output signal of amplifier 7 being applied to both inputs of the multiplier. The output signal of the multiplier is applied via a resistor to the input of the amplifier 57. Thereby, the measured variance constitutes the mean value of the squares of the deviations of the measured values from the mean value.

Figure 2:
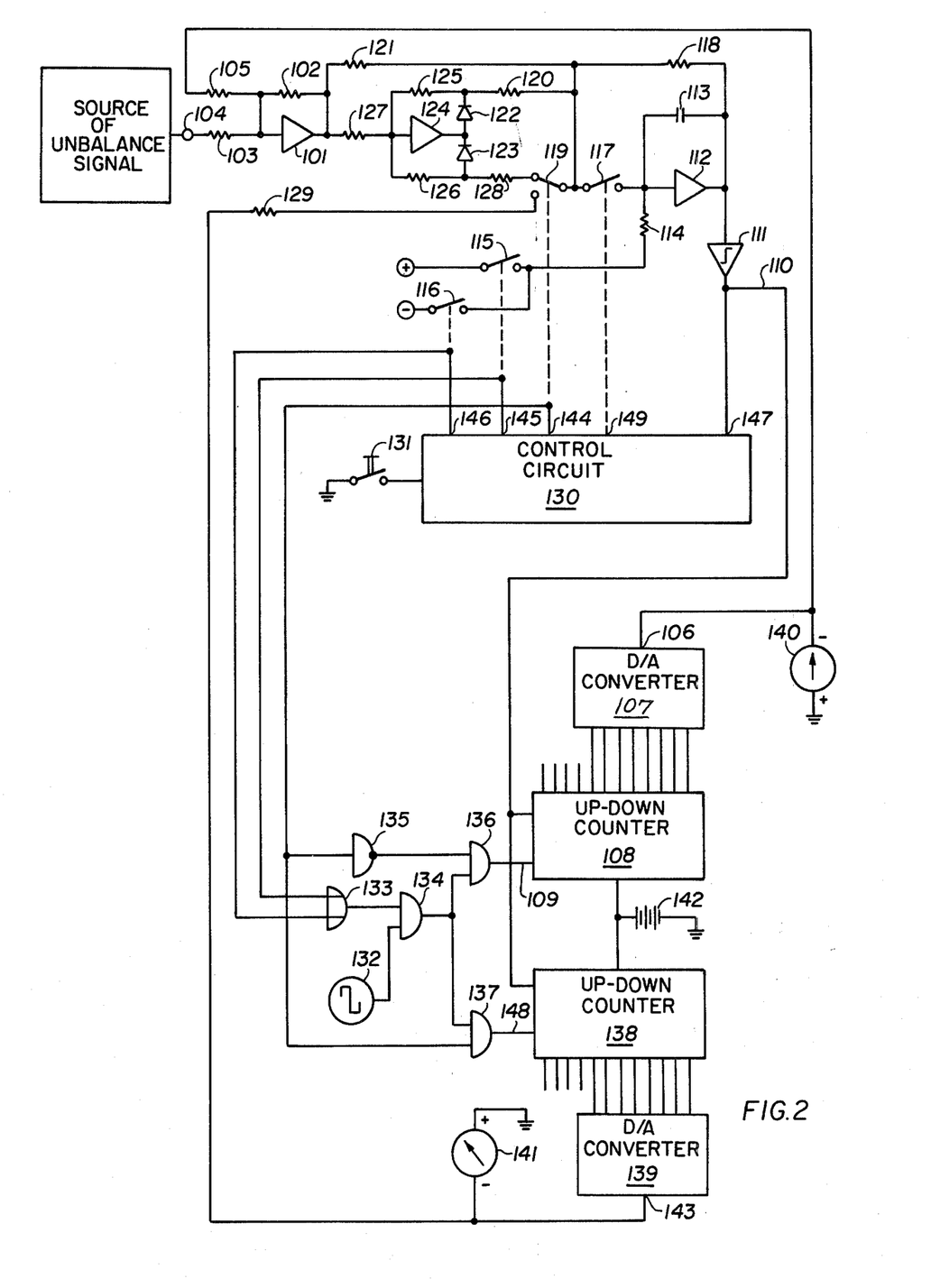
FIG. 2 is a circuit diagram showing another embodiment of the invention.

FIG. 2 shows a further realization of the circuit, which can be constructed without wear-prone components such as servo-potentiometers. The instant measured value representing signal present at the terminal 104 is fed via the resistor 103 to the input of the operational amplifier 101 which is provided with negative feedback through the resistor 102. The mean value representing signal, with the sign reversed and coming from the output 106 of the digital-to-analog converter 107 is also supplied to the input of the operational amplifier 101 through a resistor 105. Thus, a voltage representing the deviation between the mean value and the instant measured value is produced at the output of the amplifier 101. The mean value must now be corrected as to magnitude and direction according to a fraction of this deviation. This is done by supplying correction pulses corresponding to the deviation between the instant measured value and the mean value, to the input line 109 of an up-down counter 108. The outputs of the counter 108 store the mean value in digital form. A digital-to-analog converter 107 is connected to the outputs of the counter 108, whereby an analog representation of the mean value is obtained. The signal on a line 110 determines in which direction the correction of the mean value takes place. This signal is supplied by the comparator 111, the input of which is connected to the output of an amplifier 112. The amplifier 112 is provided with a negative feed back via the capacitor 113. A positive voltage may be fed to the input of the amplifier 112 through the resistor 114 and a switch 115. Similarly, a negative voltage may be supplied to the input of the amplifier 112 via a switch 116 which is connected in parallel to switch 115. Further, a switch 117 is connected to the input of the amplifier 112, whereby a further negative feedback path with a resistor 118 as well as three input values may be supplied to the amplifier 112. These input values are from the output of the amplifier 101 via the resistor 121, the output of a further amplifier 124 for a positive output voltage via the diode 122 and the resistor 120; and for a negative output voltage, via the diode 123, a resistor 128 and the normally closed contact of the switch 119. The input of the amplifier 124 is connected by the resistor 127 to the output of the amplifier 101 and provided with a negative feedback for a negative output voltage via the diode 123 and the resistor 126, and for a positive voltage via the diode 122 and a resistor 125. All amplifiers are inverting operational amplifiers with very high gain. The resistors are preferably selected as follows:

resistors 103 and 105 have the same value;
resistor 102 has one-half the resistance of resistor 105 or resistor 103;
resistors 125, 126, and 127 are equal to each other;
resistors 118 and 121 have the same value;
resistors 120 and 128 have one-half the
resistance of resistor 118 or resistor 121;

The switches in FIG. 2 are shown as contacts for the sake of clarity, although field-effect transistors or other contactless switches can be used in practice for this purpose. They are operated by a control circuit 130. The control circuit 130 causes pulses of a generator 132 to be distributed to both up-down counters 108 and 138, the contents of which are the mean value and the measure of the mean deviation, respectively, in digital form.

For this purpose, the output of generator 132 is applied to one input of an AND-gate 134. The output of the gate 134 is applied to one input of each of the AND gates 136 and 137. The outputs of the latter constitute the counting pulses on the lines 109 and 148 for the counters 108 and 138, respectively. The second input of the AND gate 137 is connected to the output 144 of the control circuit 130 directly and the second input of the gate 136 is connected to the output 144 via the inverter 135. The second input of the AND gate 134 is the output of the OR gate 133. The inputs of the OR gate 133 are connected to separate outputs 145 and 146 of the control circuit 130. The outputs of counter 138, which correspond to the measure of the mean deviation, are applied to the digital-to-analog converter 139. The output 143 of converter 139 can be applied to the input of the amplifier 112 via the resistor 129 by means of the normally open contact of switch 119. The resistance of resistor 129 is preferably twice that of the resistor 118.

The control circuit 130 executes the function cycle in the following manner by operating the switches 115, 116, 117 and 119 as well as the gates 133 and 137, and the inverter 135.

The switch 131 indicates to the control circuit 130 that a new to-be-processed measurement value is present at the terminal 104. In the first part of the function cycle, i.e., correction of the mean value, the control circuit 130 delivers a signal at its output 144 such that the switch 119 remains in the normally closed position shown and the AND gate 136 is enabled via the inverter 135 to pass counting pulses to the mean-value counter 108. If the switch 119 is in the position shown, the amplifier 124 merely inverts the output signal of amplifier 101 by feeding a current of opposite direction twice as large via the resistance 121 to the input of the amplifier 112, depending on the polarity of the output voltage of the amplifier 124, via the diode 122 and the resistor 120 or via the diode 123, the resistance 128 and the switch 119. In a first step, an output 149 of the control circuit 130 now closes the switch 117 for a fixed time. Thereby, negative feedback is provided for the amplifier 112 via the resistor 118 as well as the capacitor 113. At the output of the amplifier 112, a voltage appears which, for the resistance ratios given, is equal to one-half the deviation between the mean value and the current measured value. The comparator 111 determines the sign of this deviation and communicates the sign to the control circuit 130 via its input 147. Further, the comparator controls the counting direction of the counters 108 and 138 via the line 110 in such a manner that the counting pulses arriving on the lines 109 and 148 are counted upward if the deviation of the mean value from the measured value is negative, and are counted downward if the deviation of the mean value from the measured value is positive. At the end of the fixed time, the output 149 of the control circuit 130 opens the switch 117, so that half the deviation is stored in the capacitor 113. Now, the control circuit selectively closes the switches 115 or 116, via its output 145 or 146, depending on the state of the comparator 111. If the output voltage of the amplifier 112 is positive, a positive constant voltage is applied to the input of the amplifier 112 through the switch 115 and the resistor 114. If the output voltage of the amplifier 112 is negative, a negative constant voltage is applied to the input of the amplifier 112 through the switch 116 and the resistor 114. As a result, the output of the amplifier 112 goes linearly toward zero with time. The comparator 111 changes its state at the instant the output voltage of the amplifier 112 crosses zero, and the control circuit 130 thereupon opens both switches 115 and 116. During the time that the control circuit held one of the switches 115 or 116 closed via its outputs 145 or 146, the AND gate 134 is opened via the OR gate 133, so that counting pulses pass from the generator 132 via the opened gates 134 and 136 to the counter 108, whereby the mean value stored in the counter is corrected toward the instant measured value and in proportion to the deviation between the measured value and the mean value.

In the second part of the function cycle the measure of the mean deviation is corrected. For this purpose the control circuit 130 delivers at its output 144 a signal such that the switch 119 is switched into the not shown (opposite) position and that the AND gate 137 is enabled for passing counting pulses to the deviation counter 138.

The amplifier 124 now derives the absolute value of the output voltage of the amplifier 101 by either feeding a positive current to the input of the amplifier 112 via the resistor 121 alone if the output voltage of the amplifier 101 is positive, or by feeding a negative current via the resistor 121 and a positive current twice as large from the amplifier 124 via the diode 122 and the resistor 120, if the output voltage of the amplifier 101 is negative. Further, the voltage present at the output 143 of the digital-to-analog converter 139 is fed to the input of the amplifier 112 via the resistor 129 and the switchover switch 119, corresponding to the negative value of the mean deviation measure. The output 149 of the control circuit 130 now closes the switch 117 again for a fixed time. Thereby, a voltage corresponding to one-half of the deviation of the stored measure of mean deviation (as the mean or average value of the absolute values of the deviation between the mean value and the measured value) from the absolute value of the deviation of the present measurement value from the mean value, is produced. This deviation is used for correcting the mean deviation measure in the counter 138. The correction is accomplished in the same manner as described above with reference to the mean value correction, whereby the comparator 111 again determines the direction. The output 149 of the control circuit 130 opens the switch 117 and, depending on the direction, either switch 115 or 116 is actuated until the comparator 111 changes its state as the voltage of the amplifier 112 passes through zero. The pulses from the generator 132 now pass to the counter 138 via the gates 134 and 137 while one of the switches 115 or 116 is closed. The counting direction is determined by the comparator 111. Thereby, a correction of the mean deviation measure is accomplished in the direction toward, and proportional to, the deviation between the absolute value of the deviation of the instant measurement value from the mean value and the former mean deviation measure.

The magnitude of the correction may be chosen by suitably dimensioning the capacitor 113, the resistor 114, the frequency of the generator 132 and the conversion factor of the digital-to-analog converters 107 and 139, respectively. A suitable value is, for instance, 3%, i.e., if an instant measured value deviates 100% from the mean value, the mean value is corrected by 3% toward the current measured value. Thus, the mean value reacts with a "time constant" or settling constant N1 of 33 measured values to a change of the mean value. The counters 108 and 138 must comprise a larger number of bits than the digital-to-analog converters 107 or 139, so that even small deviations can add up to a correction. An embodiment with a 12-stage binary counter is advantageous, the most significant bit indicating the sign, while the converters 107, 139 need to process only 7 bits plus the sign.

The digital-to-analog converters are constructed so that a positive mean value is represented at their output by a negative voltage.

The outputs of the digital-to-analog converters 107 and 139 correspond to the sign reversed values of the mean value and the mean deviation measure, respectively, and can be indicated by means of suitable instruments, such as meters 140 and 141, or otherwise suitably processed in analog form. However, digital display or processing of the outputs of the counters 108 and 138 is also possible.

Figure 4:
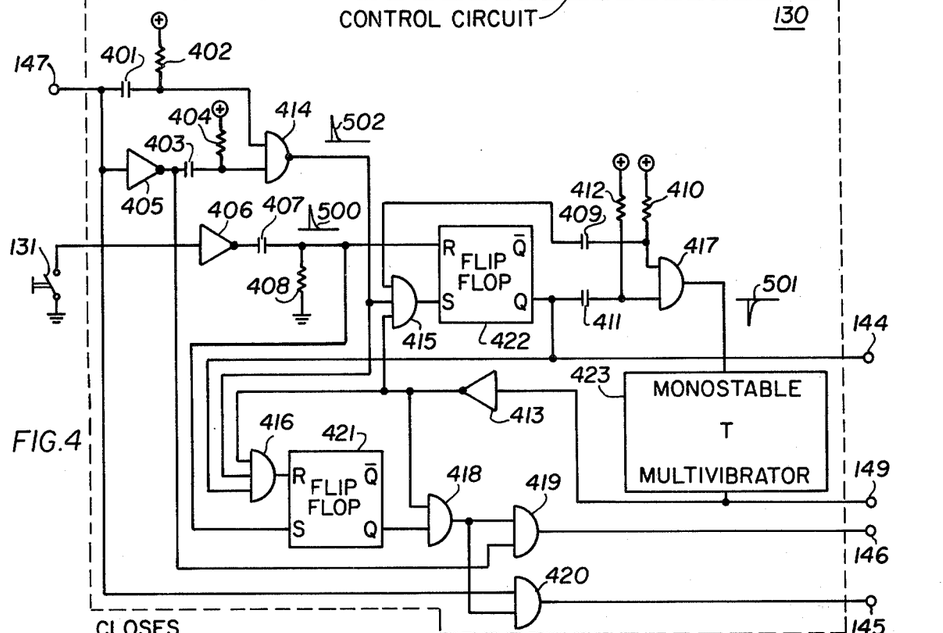
FIG. 4 shows details of a control circuit which may be used in FIG. 2.

In order to avoid loss of the values of the mean value and the mean deviation measure, when the supply voltage is switched off, the counters 108 and 138 are preferably built with integrated circuits in complementary MOS technology and supplied by a battery 142. FIG. 4 shows one possible embodiment of the control circuit 130 of FIG. 2. In the following description, for the purpose of convenience, a "high" signal is a logic "one" signal, whereas a "low" signal is a logic "zero" signal.

A resetting pulse 500 is generated by closing a switch 131, for example manually, or by a signal derived from the machine cycle of a transfer machine. The pulse passes through an inverter 406 and a differentiating capacitor-resistor network 407, 408. The pulse 500 is applied to the reset input R of an R-S flip-flop 422 and to the set input S of an R-S flip-flop 421.

The output Q of the flip-flop 422 is the control output 144 in FIG. 2. A low output signal at the control output 144 keeps the switch 119 of FIG. 2 in the position shown. The output Q of the flip-flop 421 assumes a high value which means that a computing is being performed. A triggering pulse 501 is generated by applying the output Q of the flip-flop 422 to a differentiating capacitor-resistor network 411, 412 and to an input of an AND gate 417. The output pulse 501 of the AND gate 417 is used to trigger the monostable circuit 423. The output of the monostable circuit 423 is the output 149 of the control circuit 130. When the output 149 assumes a high value the switch 117 of FIG. 2 is closed.

Figure 5:
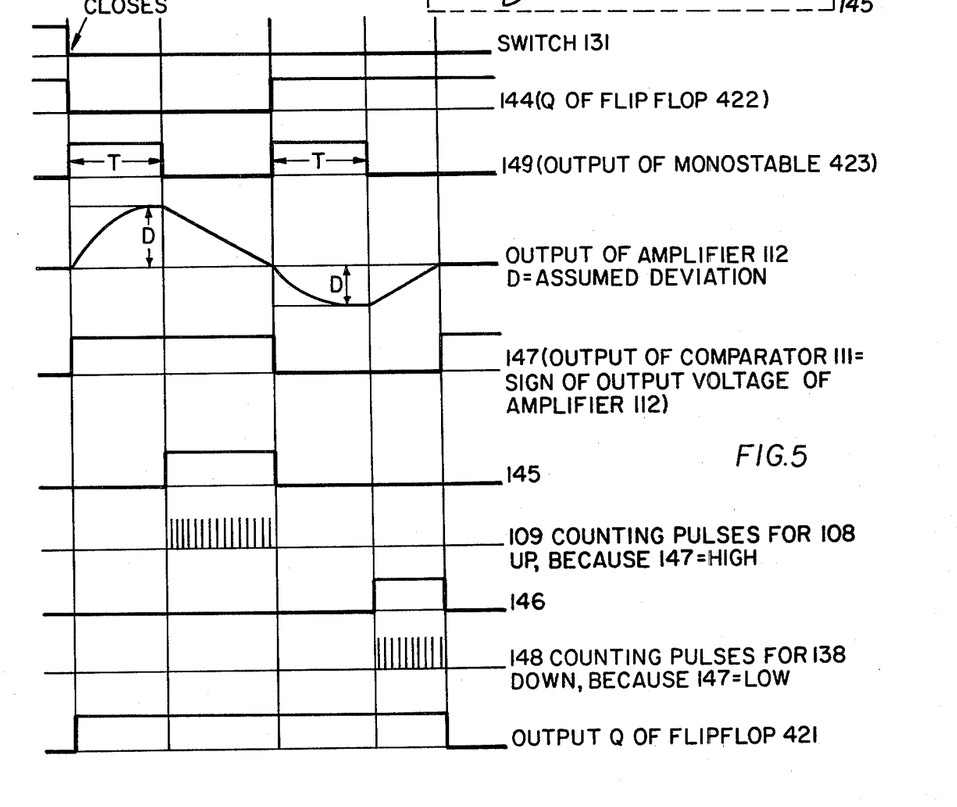
FIG. 5 is a timing diagram for the signals in FIGS. 2 and 4.

FIG. 5 shows that the output of the amplifier 112 rises to ½ deviation = D with a time constant equalling the product of the value of the capacitor 113 and the resistor 118. The comparator 111 senses the sign of D. If, for example D is positive, the output of the comparator 111 assumes a logical one, which is used as the input 147 to the control circuit 130. After a time interval T has passed, the output of the monostable circuit 423 becomes low again as seen in FIG. 5 whereby the switch 117 of FIG. 2 is open. Simultaneously, the output of the inverter 413 assumes a high value.

The output of the inverter 413 and the Q output of the flip-flop 421 are applied to an AND gate 418 whereby the output of the AND gate 418 also assumes a high value. The output of the comparator 111 at the control input 147 and the output of the gate 418 are applied to an AND gate 420. Thus, for a positive sign of D, the output of the gate 420 also assumes a high value to provide the output 145 of the control circuit 130. The logical one level at the output 145 closes the switch 115 in FIG. 2. The output of the amplifier 112 ramps down linearly as shown in FIG. 5, because switch 117 is open. The output of the comparator 111 and thus the input to the control circuit 130 will go low if it senses a zero crossing of the output of the amplifier 112. A pulse 502 is generated by applying this signal to a differentiating capacitor-resistor network 401, 402 and to one input of the NAND gate 414. The pulse 502 at the output of the NAND gate 414 is applied to one of the inputs of an AND gate 415. The other inputs of the AND gate 415 are high. Therefore, the gate 415 generates an output pulse which sets the flip-flop 422 so that the output 144 is high, as shown in FIG. 5.

The logical one at the output 144 of the control circuit 130 activates the switch 119 in FIG. 2 whereby the circuit through the resistor 129 in FIG. 2 is closed to correct the mean deviation measure.

Simultaneously, the output Q of the flip-flop 422 goes low. This signal is applied to a differentiating capacitor-resistor network 409, 410 and to an input of the AND gate 417 whereby the generated pulse will once again trigger the monostable multivibrator 423. The output 149 of the control circuit 130 assumes a logical one level and closes the switch 117 in FIG. 2 whereby the output of the amplifier 112 reaches a new value of the deviation D which is assumed to be negative.

The comparator 111 senses the negative sign at the output of the amplifier 112 whereby the control input 147 of the control circuit 130 becomes low. The low signal at the input 147 is applied to an inverter 405 which thereby enables the AND gate 419.

After the time interval T has elapsed, the output of the multivibrator 423 returns to zero, whereby the output of the inverter 413 goes high. Simultaneously, the switch 117 in FIG. 2 opens. The output of the AND gate 418 goes high as a result of the logical one output of the inverter 413 and the logical one output of the flip-flop 421. Thus, the output 146 of the control circuit 130 assumes the logical one state if a signal corresponding to a negative sign of D is applied to the inverter 405. The logical one level of the output 146 closes the switch 116 in FIG. 2 whereby a negative voltage is applied to the amplifier 112 causing the output of the amplifier 112 to ramp up linearly to zero.

The input 147 to the control circuit 130 goes high when the comparator 111 senses a zero crossing. This signal, after being inverted by the inverter 405, is applied to a differentiating capacitor-resistor network 403, 404 and to an input of the NAND gate 414. Thus, one of the inputs of the gate 414 goes low momentarily whereby an output pulse is applied to one of the inputs of an AND gate 416. The other inputs of the AND gate 416 are the inverted output of the monostable multivibrator 423 and the Q output of the flip-flop 422. At this time these inputs of AND gate 416 are both high as shown in FIG. 5. Therefore, the AND gate 416 generates an output pulse which resets the flip-flop 421. The low output Q of the flip-flop 421 disables the AND gates 419 and 420 through the AND gate 418 whereby the computation is completed.

During the times when the outputs 145 and 146 are high, as described above, the AND gate 134 in FIG. 2 is enabled whereby counting pulses are applied to the up-down counters 108 or 138, as shown in FIG. 5. These counting pulses are counted up or down depending upon the state of the comparator 111.

Incidentally, during the first two time intervals in FIG. 5 it is assumed that there is a positive deviation between the measured value and the mean value. During the next two time intervals a negative deviation is assumed between the absolute deviation value of the measured value from the mean value and the value or measure of the mean deviation.

Figure 6:
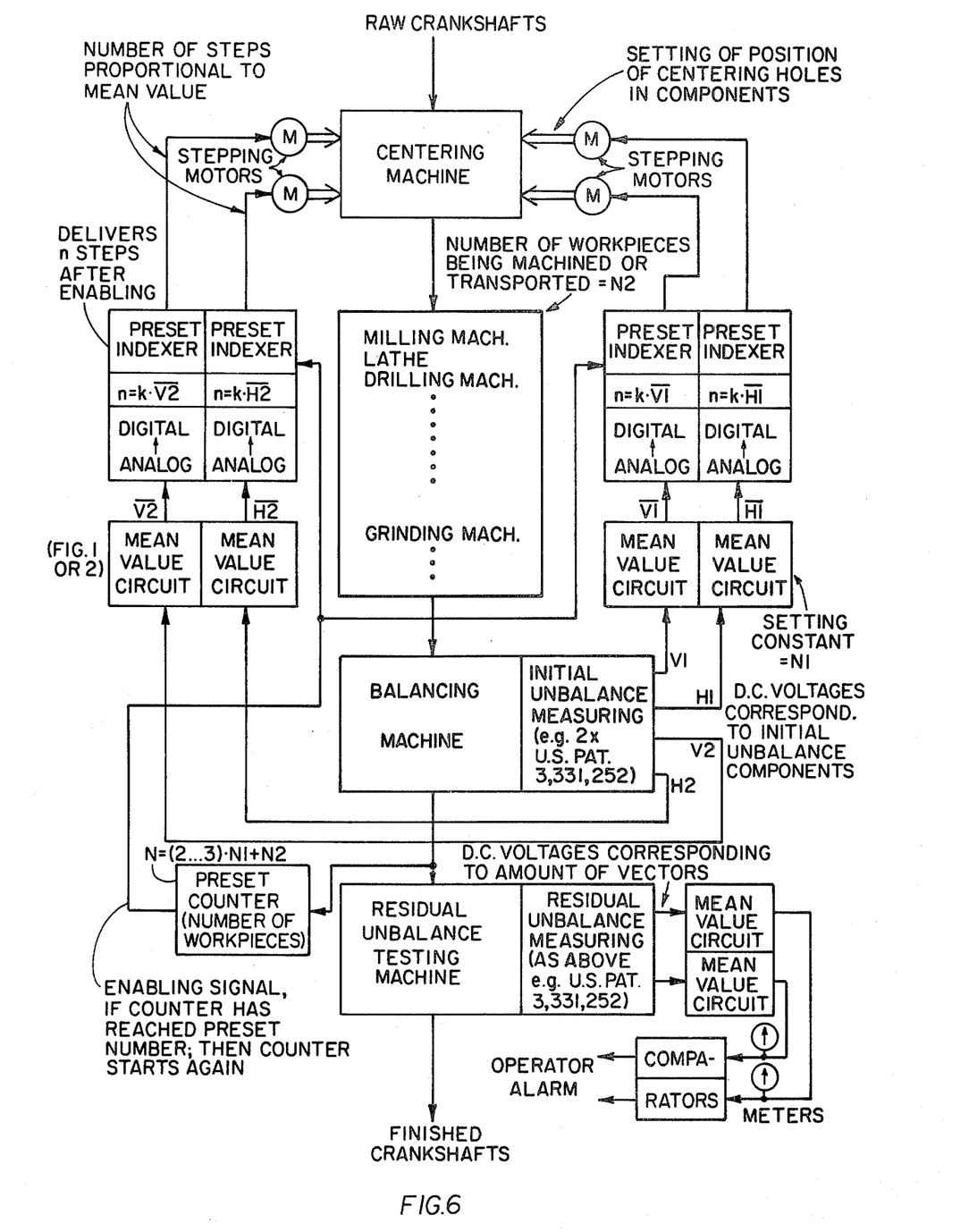
FIG. 6 is a block flow diagram showing how the method of the invention is used to automatically control centering machines, and to also check the work quality of automatic balancing machines.

FIG. 6 with its labels is a self-explanatory general view of the components which cooperate in practicing the present method, for example in the manufacture of crankshafts coming in their "raw" form from a forge. The crankshafts are placed in a centering machine which is controlled in accordance with the invention for the setting of centering holes.

From the centering machine the work pieces, N2 in number, are subjected to a machining operation whereupon they are placed into a balancing machine where the initial unbalance is measured, for example in two planes, each plane providing two component signals V1, H1 and V2, H2. These signals may be obtained by means of an apparatus such as disclosed in U.S. Pat. No. 3,331,252.

The signal components V1, H1 and V2, H2 are supplied to the mean value circuits shown in FIGS. 1 and 2 of the present disclosure which produce the mean value signals V1, H1 and V2, H2. These signals pass through analog to digital converters and through indexing pulse generators or indexers which are also responsive to a preset number from the present work piece counter. These indexers provide a stepping signal for the stepping motors of the centering machine.

Subsequent to the balancing a residual unbalance testing machine receives the work pieces from the balancing machine and again mean value circuits provide an output signal for alerting the operator.

Although the invention has been described with reference to specific example embodiments, it is to be understood that it is intended to cover all modifications and equivalents within the scope of the appended claims.

What is claimed is:

1. A control signal modifying system comprising a source of input signals corresponding to sequentially occurring measurements, first and second storage means, comparing means operatively connected to said input signal source and to said first storage means for continuously comparing said input signals with signals stored in said first storage means to produce difference signals means operatively connected for adding a predetermined proportion of said difference signals to the output signals, of said first storage means to produce a corrected mean value signal, circuit means connected to said adding means and to said second storage means for applying said corrected mean value signal to said second storage means for storage, signal transfer means operatively connected to said first and second storage means for transferring said corrected mean value signals from said second storage means to said first storage means, and control means operatively connected to sequentially control said first and second storage means and said signal transfer means, whereby signals stored in said first storage means correspond substantially continuously to the mean value of said input signals, and wherein said first storage means comprises counter means, said second storage means comprises analog storage means, said means for adding comprising a source of pulses, said system further comprising means responsive to the amplitude of signals stored in said second storage means for controlling the number of pulses applied from said source of pulses to said counter means of said first storage means.

2. The signal modifying system of claim 1, wherein said circuit means for applying said corrected mean value signals to said second storage means and said signal means comprise first and second switch means, respectively, and wherein said control means comprises means for sequentially operating said first and second switch means.

3. The system of claim 1, wherein said counter means comprises an up-down counter.

4. The system of claim 1, further comprising third storage means, means producing an absolute value signal that is a function of said difference signals, means comparing said absolute value signal continuously with signals stored in said third storage means to produce a deviation signal, and means for correcting signals stored in said third storage means in response to said deviation signal, whereby the signals stored in said third storage means comprise a mean deviation signal.

5. The system of claim 4, wherein said means for correcting comprises storage means, means for adding a predetermined portion of said deviation signal to the output of said third storage means to produce a corrected mean deviation signal, means storing said corrected mean deviation signal in said storage means of the correcting means, and means for transferring signals stored in said storage means to said third storage means of the correcting means.

6. The system of claim 4, wherein said correcting means comprises means for comparing said absolute values signals with signals stored in said third storage means to produce corrected mean deviation signals, means for storing said corrected mean deviation signals in said second storage means, and means for transferring said corrected mean deviation signals from said second storage means to said third storage means.

7. The system of claim 4, wherein said means producing an absolute value signal comprises diode means.

8. The system of claim 1, wherein said comparing means comprises difference amplifier means.

9. The system of claim 1, wherein said first storage means comprises a permanent storage device whereby the use of line power energization for maintaining stored values is avoided.

10. The system of claim 1, wherein said counter means of said first counter storage means has stored therein a mean value, said system further comprising means operatively connecting said source of input signals and said first storage means to said differential amplifier means to produce a deviation value between said input signals and said stored mean value in said first counter storage means, further amplifier means, evaluating resistor means operatively arranged between an output of said differential amplifier means and an input of said further amplifier means, said adding means operatively connecting an output of said first storage means to said further amplifier means to add said deviation value to said stored mean value at the input of said further amplifier means, whereby a sum value is provided, said second storage means being operatively connected to said further amplifier means to supply said sum value to said second storage means, and means connecting said second storage means to said first storage means for subsequently transferring said sum from said second storage means into said first storage means.

11. The system of claim 10, wherein said first counter storage means comprise a permanent memory which retains the stored value over prolonged periods of time and even when the power supply is off.

12. The system of claim 1 for producing a corrected mean deviation value, further comprising mean value producing means, said comparing means comprising first differential amplifier means operatively connected to said source of input signals, and to said mean value producing means to provide said difference signals, second differential amplifier means, said first counter storage means providing a mean deviation or variance representing value, first means connecting said first differential amplifier means to said second differential amplifier means, further means connecting said first counter storage means to said second differential amplifier means whereby the second differential amplifier means produces a deviation value between the mean deviation or variance representing value and the difference signals from the first differential amplifier, said adding means comprising third amplifier means operatively connected to said second differential amplifier means and to said first counter storage means whereby the deviation value from said second differential amplifier means is added at the input of said third amplifier means to the mean deviation or variance representing value from the output of the first counter storage means to produce a sum value, said second storage means being operatively connected to said first counter storage means and to said third amplifier means whereby the sum value is first stored in said second storage means from which it may be subsequently transferred into said first storage means.

13. The system of claim 12, wherein said first connecting means comprise diodes to form the absolute value of said difference signals.

14. The system of claim 12, wherein said first connecting means comprise square formation circuit means to form the square of said difference signals.

15. The system of claim 12, further comprising evaluating resistor means operatively connected between said second differential amplifier means and said third amplifier means whereby a predetermined proportion of said deviation value is added to the mean deviation or variance representing value.

16. The system of claim 12, wherein said first counter storage means comprise a permanent memory which retains the stored value over prolonged periods of time and even when the power supply is off.

* * * * *

UNITED STATES PATENT OFFICE
CERTIFICATE OF CORRECTION

Patent No. 4,144,578          Dated March 13, 1979

Inventor(s) Martin Mueller et al

It is certified that error appears in the above-identified patent and that said Letters Patent are hereby corrected as shown below:

Claim 1, line 8, after "signals" insert --,--;

line 10, after "signals" delete ",".

Claim 2, line 4, after "signal" insert --transfer--.

Signed and Sealed this

Eighteenth Day of December 1979

[SEAL]

Attest:

SIDNEY A. DIAMOND

Attesting Officer      Commissioner of Patents and Trademarks